July 13, 1943.  R. S. PLEXICO  2,324,021
SNUBBER FOR ENGINE MOUNTINGS
Filed July 19, 1941  2 Sheets-Sheet 1
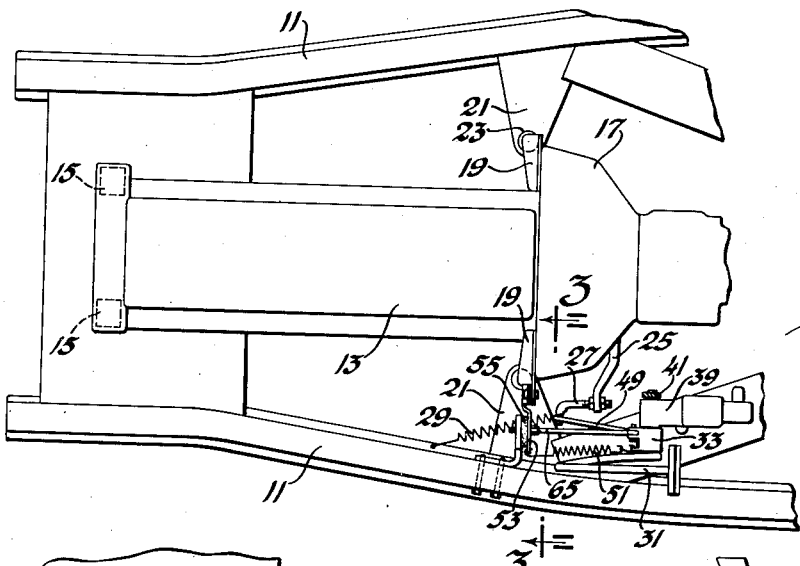
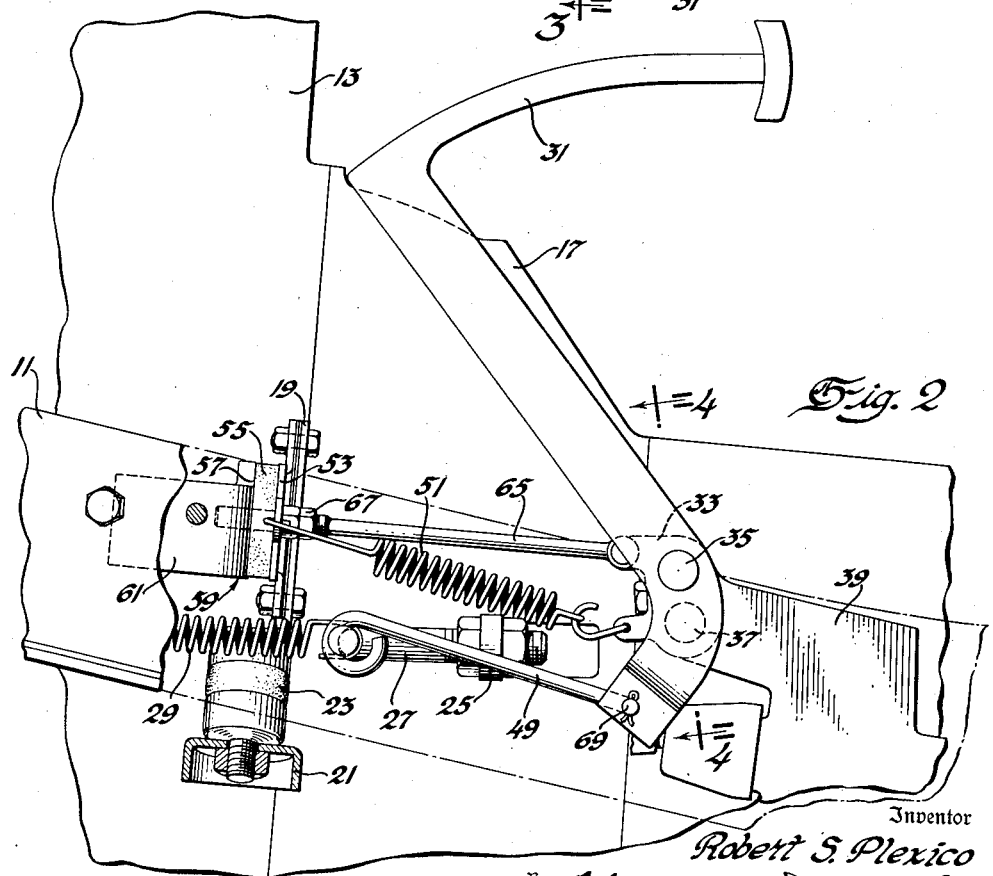
Inventor
Robert S. Plexico
By
Blackmore, Spencer & Flint
Attorneys July 13, 1943.                R. S. PLEXICO                2,324,021
                        SNUBBER FOR ENGINE MOUNTINGS
                           Filed July 19, 1941            2 Sheets-Sheet 2
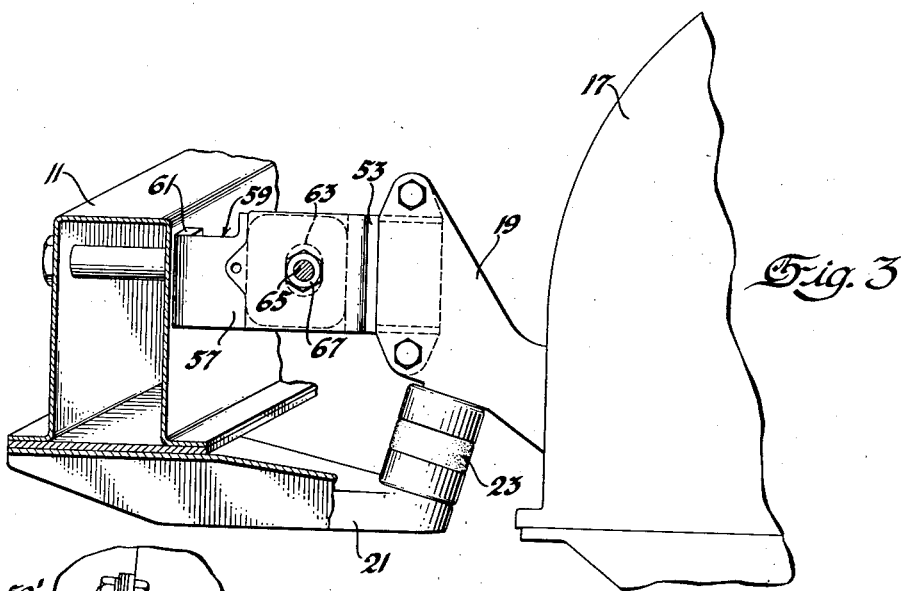
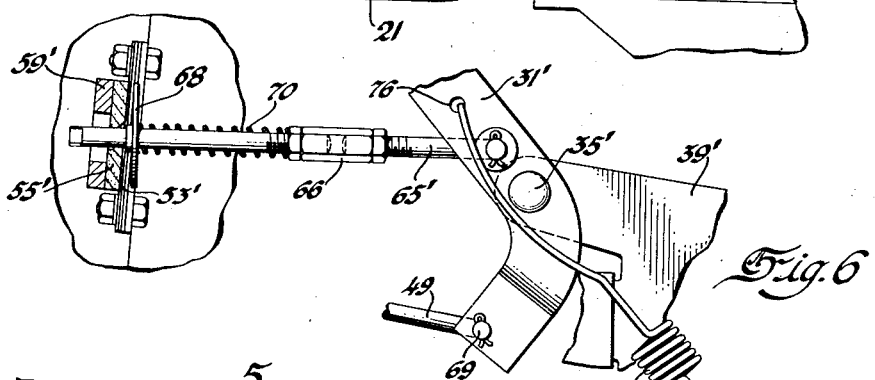
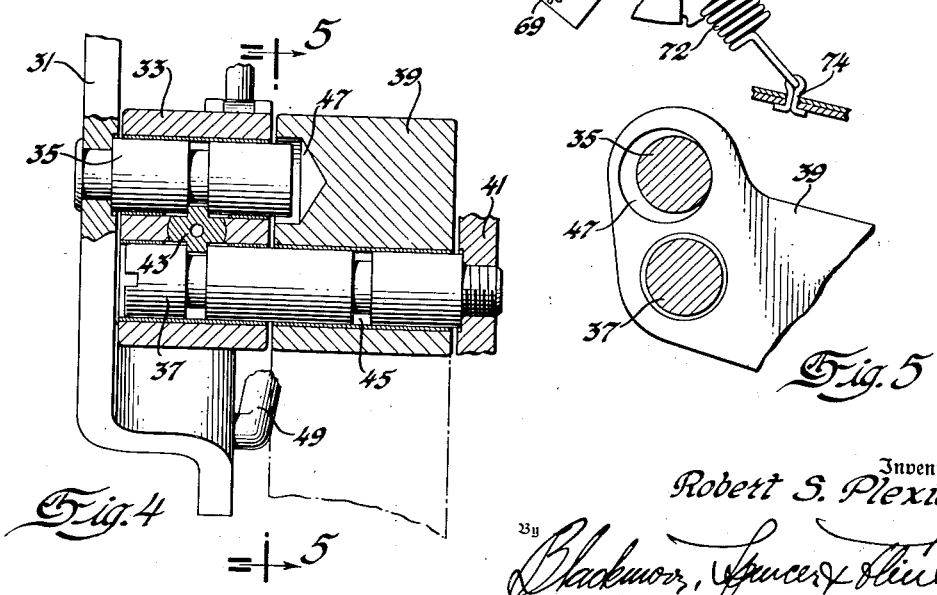
Inventor
Robert S. Plexico
By Blackmore, Spencer & Flint
Attorneys Patented July 13, 1943

2,324,021

UNITED STATES PATENT OFFICE 2,324,021

SNUBBER FOR ENGINE MOUNTINGS

Robert S. Plexico, Royal Oak, Mich., assignor to General Motors Corporation, Detroit, Mich., a corporation of Delaware Application July 19, 1941, Serial No. 403,091

4 Claims. (Cl. 180—64)

This invention relates to motor vehicles and its object is to supplement the engine support with a snubber to prevent the transmission of excessive engine vibrations when the clutch is being released and re-engaged.

In recent years it has been common practice to increase the flexibility of the resilient deformable members which are used for supporting the engine on the frame. The added flexibility tends to prevent the transmission of engine vibration to the frame and body. With such soft cushions as are now used the chassis frame is quite free from such vibration. There are times when the cushions are too soft. This occurs during the time of release and re-engagement of the members of the friction clutch, when there occurs some degree of clutch slipping. Also the reaction of the excessive engine vibrations which are not sufficiently restrained by the very soft engine supports may seriously amplify the errors of the geometry of the clutch operating mechanism. It is the object of this invention to correct the above difficulty. It does so by the introduction of snubbing means to resist the engine movements but only during the time when those movements are too great to be restrained by the soft engine supporting means. This snubbing means also prevents the interference by such excessive engine movements with the desired clutch operating mechanism. Since the clutch slipping occurs only when the clutch is partially released, it has been found desirable to introduce the snubbing action in response to the depression of the clutch pedal.

On the accompanying drawings

Figure 1 is a top plan view of a part of a motor vehicle having my invention embodied therein.

Figure 2 is a view in elevation.

Figure 3 is a section on line 3—3 of Figure 1.

Figure 4 is a section on line 4—4 of Figure 2.

Figure 5 is a section on line 5—5 of Figure 4.

Figure 6 is a view in elevation of a modification.

On the drawings, numeral 11 represents the frame of a motor vehicle upon which is mounted an engine 13. At the front end of the engine are shown by dotted lines deformable resilient cushions 15 designed for the support of the engine on the frame. In the region of the clutch housing 17 the engine has laterally projecting members 19 underneath each of which is a frame bracket 21 and between the two pairs of members, 19 and 21, are supporting cushions 23.

Extending from the clutch housing 17 is a clutch releasing lever 25 to the end of which is secured an arm 27. A spring 29 anchored to the frame and connected to the end of arm 27 holds the latter in the position corresponding to clutch engagement.

The clutch pedal is identified by numeral 31. It is pivoted on a link 33 by a pin 35. Link 33 is pivoted to some part rigid with the frame. The drawing shows a pin 37 serving as the pivot for the link and the master cylinder 39 of the brake system carries the pivot pin. The brake pedal 41 may be carried on the opposite end of pin 37. Any convenient securing means 43 serves to retain the two pins relative to the link and other means, not shown, may be projected through the wall of part 39 and into a groove 45 of pin 37 to retain the latter in position. It will be noted that there is an opening 47 in the master cylinder into which the end of pin 35 projects. The opening is greater than the diameter of pin 35 whereby the link may rock on pin 37 but to a limited extent. To the lower end of the clutch pedal is attached a pull rod 49, the remote end of which rod is connected to arm 27. It will be understood that the clutch is released by the depression of the pedal acting through parts 49, 27 and 25. To the lower end of link 33 is connected a spring 51.

The resilient engine support described above serves well to cushion the chassis frame and the body supported thereon from inherent vibrations of the engine. When, however, the clutch is being released and reengaged there occurs a slipping action between the driving and driven parts which amplifies the engine vibration. The very soft engine mounting does not sufficiently resist the vibrations and the movements of the engine carried lever 25 are transmitted to the pedal with undesirable results. In the past the softness of the cushion engine mounting has been a compromise, more rigid than is desired for normal driving but rather too soft for the time when the clutch is slipping.

In accordance with this invention a plate 53 shaped as shown is attached to the engine carried part 19. It carries a rubber block 55. The block is located closely adjacent, but normally out of contact with the face 57 of a bracket 59 having an arm 61 secured to the frame. Face 57 has an enlarged opening 63 for the passage of a rod 65 attached to the upper end of link 33. On the rod are nuts 67 engaging plate 53, on the side remote from the rubber block 55.

When the clutch is engaged and the pedal released, the rubber block 55 is spaced slightly from the frame carried member 59, and it has no function. The cushions 15 and 23 provide the soft engine support. When the clutch pedal is depressed and before any releasing movement occurs the pedal swings about its pivotal connection with link 49 at 69. This is for the reason that a swinging movement about 69 encounters the least resistance. In so swinging, spring 51 is stressed because the link 33 is rocked about its pin 37 by the pedal. Also the push rod 65 operates to forcibly push the block 55 against the frame plate 59. Thereafter the pedal rocks about its pin 35 and releases the clutch. During the time of clutch release and re-engagement, vibrations of the engine are resisted not only by the cushions 15 and 23 but by the snubbing action of the rubber block which acts in shear to resist oscillations of the engine about its longitudinal axis. After the clutch is re-engaged the spring 51 restores the link 33 and with it the pedal to its clutch engaged position. It will be apparent that the opening 47 provides for the movement of link 33 and that in the event of failure of the mechanism described to operate as stated, the pedal pin 35 may engage the limiting wall of opening 47 and act as a simple lever to effect clutch release.

In Figure 6 there is shown a form wherein pedal 31' is pivoted on a pin 35' to the master cylinder 39'. Pull rod 49 is connected to the lower end of the pedal as before. At a point above pivot pin 35' there is connected to the pedal a push rod 65' having therein a turnbuckle 66 for the purpose of adjustability. An engine carried member 53' carries a rubber block 55' which seats in the act of clutch release against a frame carried plate 59'. Between the turnbuckle 66 and a plate 68 carried by the push rod is a spring 70. Rod 65' extends through openings in the rubber block and member 59'. In this case the pedal depression operates as before. The resistance to depression caused by the return actuating spring 70 is in part overcome by an overcenter spring 72 attached to any convenient fixed anchorage 74 and to the pedal at 76, the spring being arranged so that it may supplement manual effort on the pedal as the snubber is brought into action against the resistance offered by spring 70.

I claim:

1. In a motor vehicle, a frame, an engine, deformable cushions to support said engine, a clutch throwout lever, a clutch pedal, connections therebetween whereby depression of the pedal releases the clutch through the instrumentality of said connections and lever, a normally inoperative snubber to resist oscillations of said engine, said snubber comprising a block of resilient deformable material between engine and frame carried parts, secured to one of said parts, and push rod means actuated by said pedal to forcibly press said block against the other part whereby the block may function in shear to resist said oscillation, together with a link pivoted to a second frame carried part, said pedal pivoted to said link whereby said pedal may first pivot about its joint with the clutch operating connection and render said block active and thereafter rotate about its pivot with the link to release the clutch.

2. In a motor vehicle, a frame, an engine, resilient means to mount said engine on said frame, overlapping parts connected to said frame and engine, a deformable element carried by a first one of said parts and located adjacent but normally out of contact with the other part, clutch releasing means and rod means operably connected to said releasing means and movable in response to movements of said releasing means to press said deformable element into contact with said other part, there being an abutment on said rod means to engage said first part, yielding means adapted to be stressed upon movement of said rod means and an overcenter spring associated with said clutch releasing means.

3. In a motor vehicle, a frame, an engine, resilient means to mount said engine on said frame, overlapping parts connected to said frame and engine, a deformable element carried by a first one of said parts and located adjacent but normally out of contact with the other part, clutch releasing means and rod means operably connected to said releasing means and movable in response to movements of said releasing means to press said deformable element into contact with said other part, there being an abutment on said rod means to engage said first part.

4. In a motor vehicle, a frame, an engine, resilient means to mount said engine on said frame, overlapping parts connected to said frame and engine, a deformable element carried by a first one of said parts and located adjacent but normally out of contact with the other part, clutch releasing means and rod means operably connected to said releasing means and movable in response to movements of said releasing means to press said deformable element into contact with said other part, there being an abutment on said rod means to engage said first part, said parts and deformable element being apertured for the passage of said rod means.

ROBERT S. PLEXICO.